April 28, 1936.  D. S. BARROWS ET AL  2,039,266
DRAFT RIGGING
Filed April 11, 1928  7 Sheets-Sheet 2
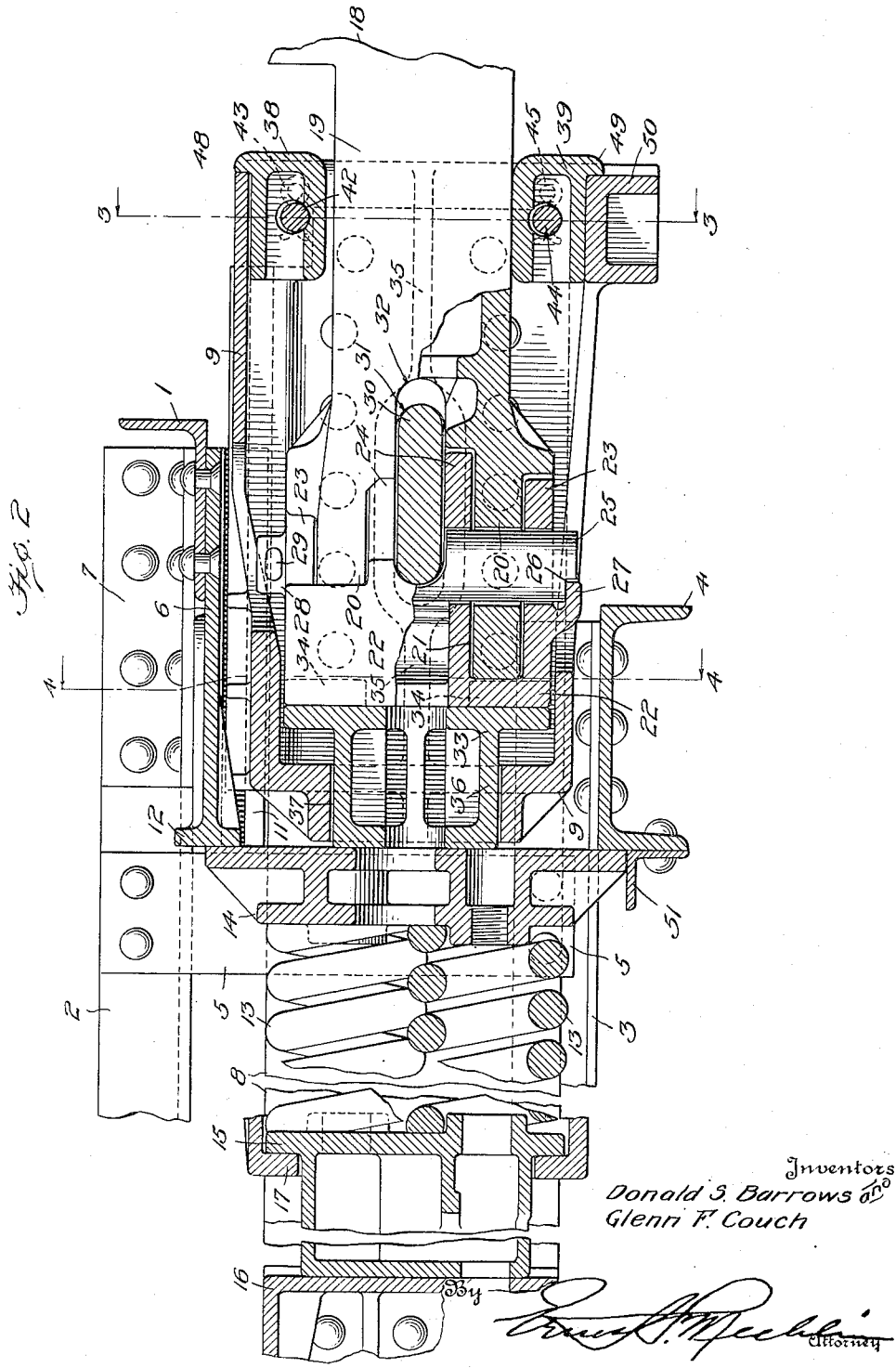
Inventors
Donald S. Barrows and
Glenn F. Couch April 28, 1936.　　D. S. BARROWS ET AL　　2,039,266
DRAFT RIGGING
Filed April 11, 1928　　7 Sheets-Sheet 3
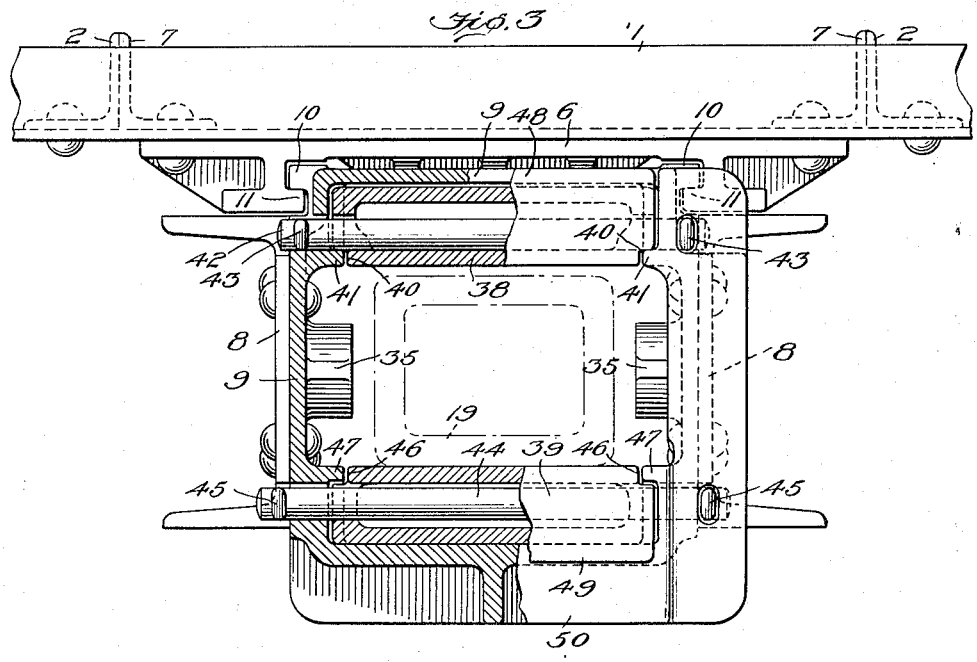
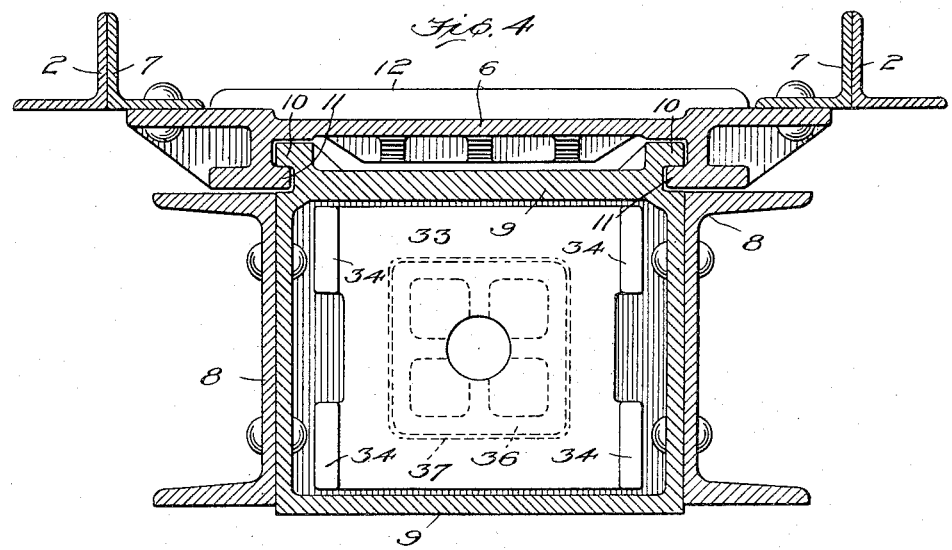
Inventors
Donald S. Barrows and
Glenn F. Couch
Attorney April 28, 1936.  D. S. BARROWS ET AL  2,039,266
DRAFT RIGGING
Filed April 11, 1928   7 Sheets-Sheet 4
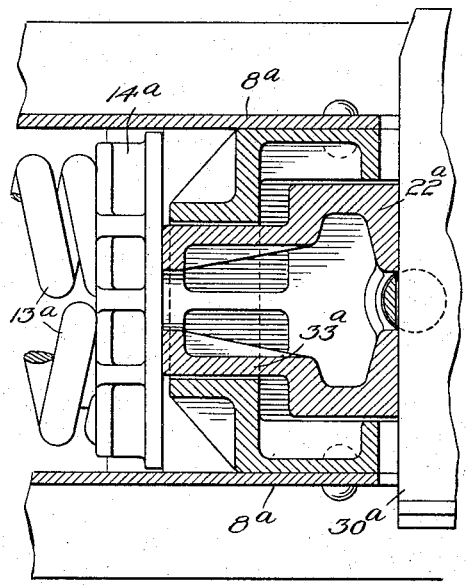
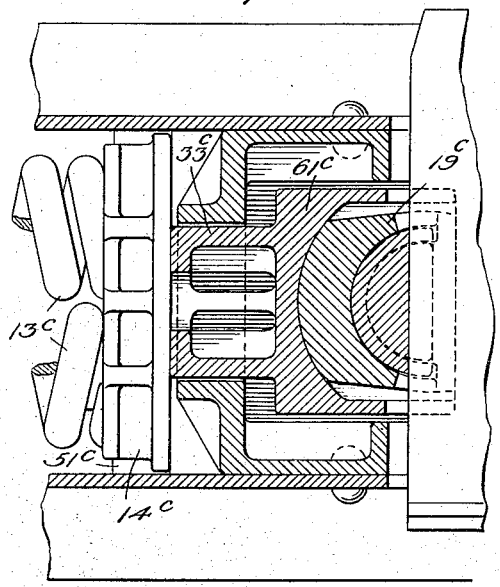
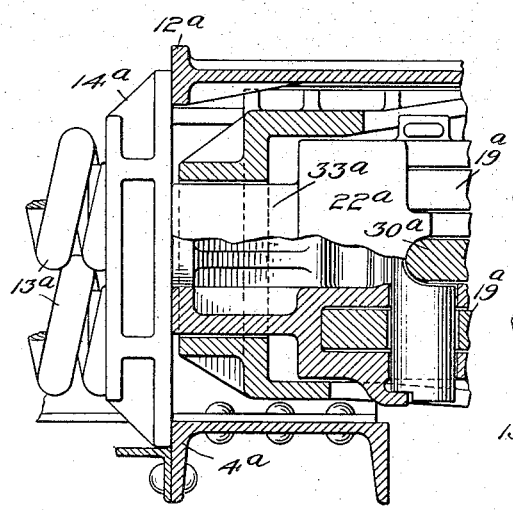
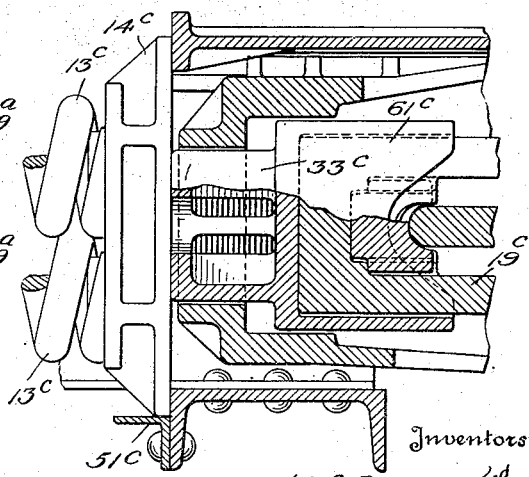
Inventors
Donald S. Barrows and
Glenn F. Couch
Attorney April 28, 1936.  D. S. BARROWS ET AL  2,039,266

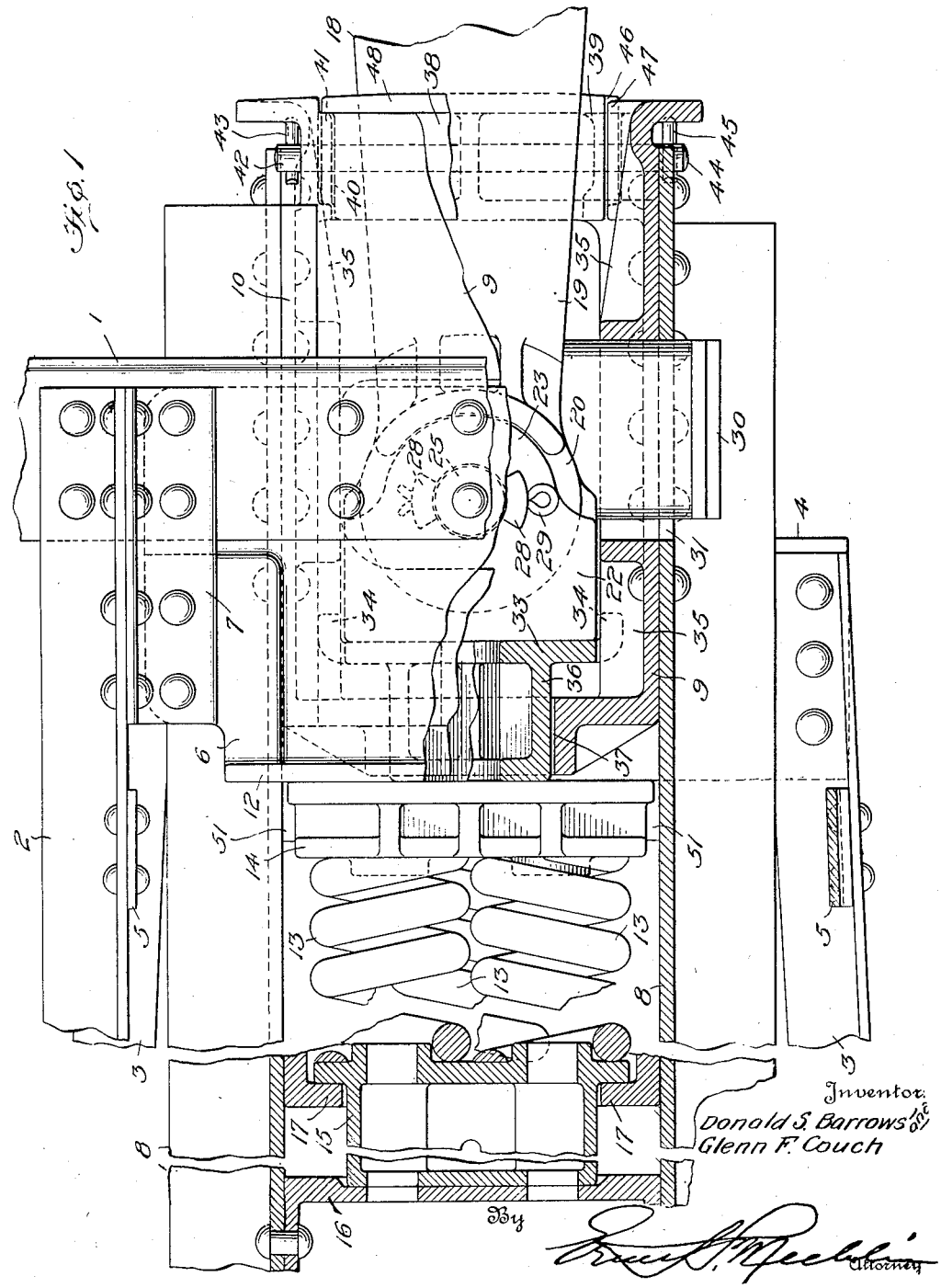

DRAFT RIGGING

Filed April 11, 1928   7 Sheets-Sheet 5

Inventors
Donald S. Barrows and
Glenn F. Couch

By

Attorney

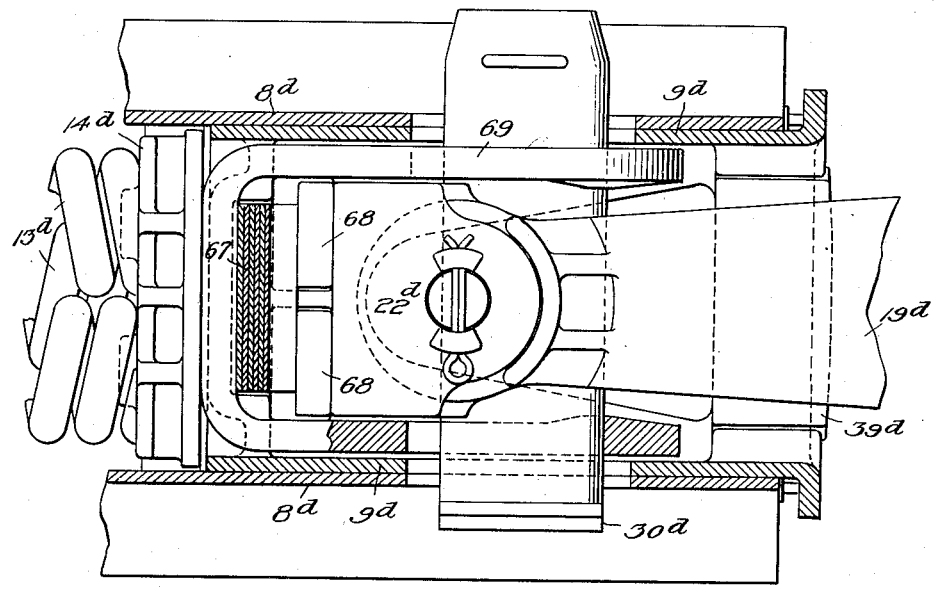
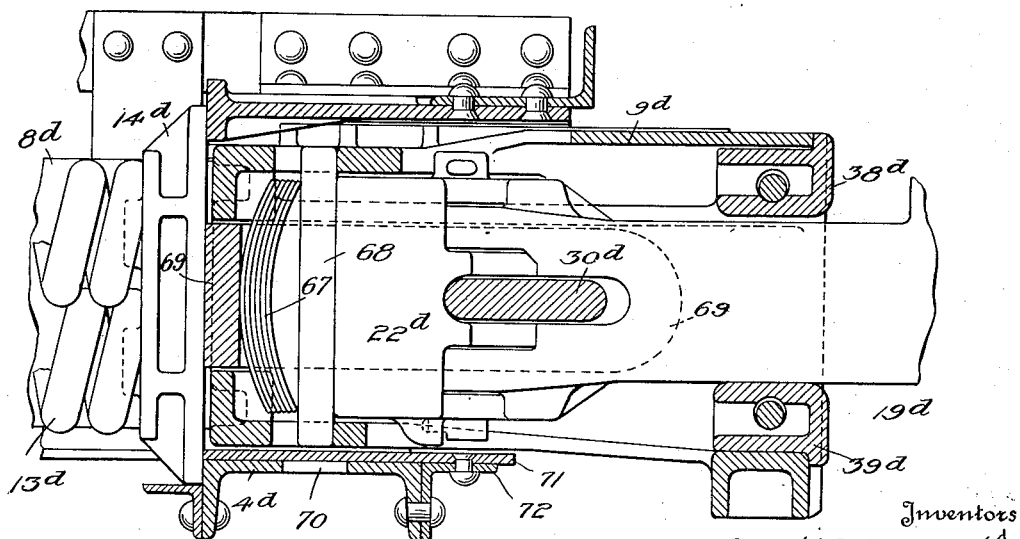

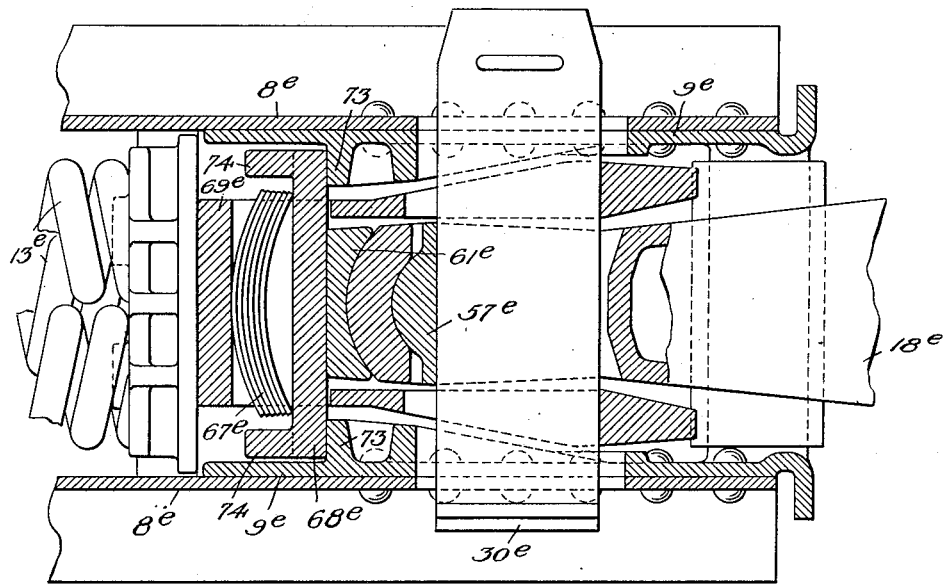
Fig. 13
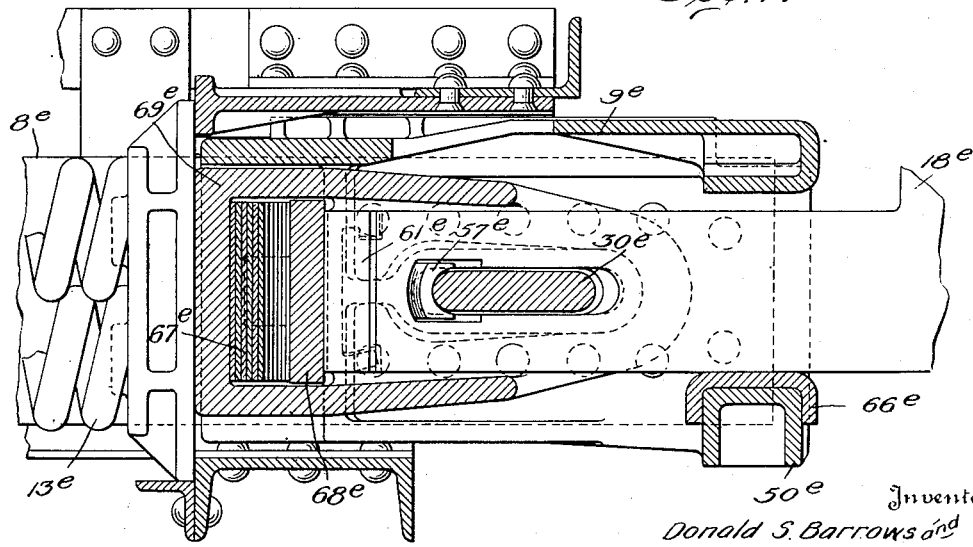
Fig. 14
Inventors
Donald S. Barrows and
Glenn F. Couch
By 
Attorney Patented Apr. 28, 1936

2,039,266

UNITED STATES PATENT OFFICE 2,039,266

DRAFT RIGGING

Donald S. Barrows and Glenn F. Couch, Rochester, N. Y., assignors to The Symington Company, Rochester, N. Y., a corporation of Maryland Application April 11, 1928, Serial No. 269,111

12 Claims. (Cl. 213—8)

This invention relates to draft rigging and more particularly to a coupler adapted to have limited horizontal angling with respect to the associated sills.

The particular object of our invention, generally considered, is to provide a form of swivel butt coupler especially adapted for use with draft rigging in which the coupler is connected to sills which are slidable longitudinally of the car underframe upon the application of buffing and draft forces, said coupler being adapted for a small amount of preliminary movement relative to said sills, thereby compressing the cushioning mechanism to a slight degree and thereafter causing the sills to move with said coupler and stress the cushioning mechanism to the desired extent between said sills, and stop portions extending from the car underframe.

Another object of our invention is to provide a swivel butt coupler for an underframe in which the sills thereof are held in brackets therebeneath and allowed to move longitudinally thereof upon the application of draft and buffing forces, said coupler being connected to said sills by a horizontal key which permits a slight relative movement therebetween, the rear portion of said coupler being formed with force transmitting means to the cushioning mechanism, whereby a preliminary compression thereof is effected before the sills start to move relative to the underframe, said sills thereafter moving relative to said underframe and developing a desired frictional resistance, said cushioning mechanism at the same time being stressed and limited in its movement with respect to the car underframe by depending stop portions therefrom which engage followers of the cushioning mechanism.

A further object of our invention is to provide a swivel butt coupler construction for car underframes in which the cushioning mechanism involves relatively long coil springs disposed between the sills of the car, said sills being movable longitudinally of the underframe to develop frictional resistance and permit a relatively great compression of the springs, said coupler being connected to said sills by a horizontal key and auxiliary cushioning means disposed between the rear of said coupler and stop portions on said sills whereby a relatively light preliminary cushioning action between the coupler and sills is provided prior to the application of normal stress to the main cushioning mechanism.

A still further object of our invention is the provision of removable blocks adjacent the striking and carrier iron portions of the ends of a car underframe whereby the opening between the sills thereof may be increased for the application and removal of couplers such as swivel butt couplers with enlarged butt portions.

Other objects and advantages of the invention relative to the particular arrangement and construction of the various parts will become apparent as the description proceeds.

Referring to the drawings illustrating our invention, the scope whereof is defined by the appended claims,—

Figure 1 is a plan, partly in horizontal section, of the end of a car underframe, showing one form of our swivel butt coupler used therewith.

Figure 2 is a central vertical longitudinal sectional view of the construction illustrated in Figure 1.

Figure 3 is a partial end elevation and partial transverse sectional view on the line 3—3 of Figure 2, looking in the direction of the arrows.

Figure 4 is a transverse sectional view on the line 4—4 of Figure 2, looking in the direction of the arrows.

Figure 5 is a partial horizontal sectional view corresponding to Figure 1 but showing a modification.

Figure 6 is a partial central vertical longitudinal sectional view of the construction illustrated in Figure 5.

Figure 9 is a fragmentary horizontal sectional view corresponding to Figure 5, but showing another modification.

Figure 10 is a vertical central longitudinal sectional view of the construction illustrated in Figure 9.

Figure 11 is a partial plan and partial horizontal sectional view corresponding to Figure 7, but showing another modification.

Figure 12 is a central longitudinal vertical sectional view of the construction illustrated in Figure 11.

Figure 13 is a horizontal sectional view corresponding to Figure 7, showing another modification.

Figure 14 is a vertical central longitudinal sectional view of the construction illustrated in Figure 13.

Figure 7:
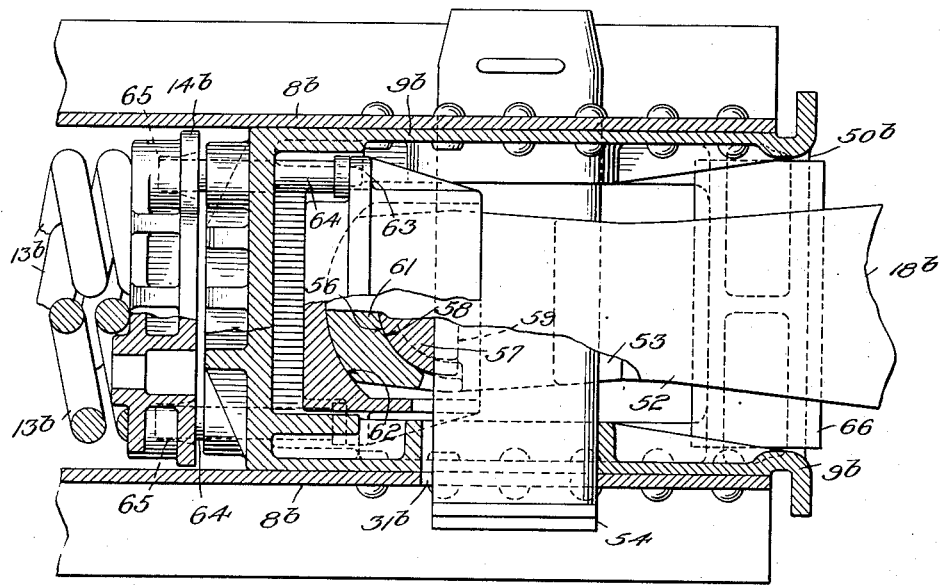
Figure 7 is a horizontal sectional view corresponding to Figure 1 but showing another modification.

Referring to the drawings in detail, like parts being designated by like reference characters, and first considering the embodiment of our invention illustrated in Figures 1 to 4, inclusive, a portion of a car underframe is illustrated involving an end sill 1 and longitudinal bracing members 2 extending from the end sill to the bolster (not shown). A construction beneath said end sill 1 and longitudinal sills 2 is provided, involving longitudinal members 3 extending from the bolster (not shown), and connected at their ends by a transverse, preferably channel member 4. The outer ends of said members 3 are preferably supported by ties 5 depending from the members 2 and riveted to said members 2 and 3. The outer ends of the members 2 are preferably joined by a combined stop and bracket member 6, the side edges of which are preferably securely connected to the adjacent sides of the members 2 by angular portions 7, as illustrated, and the front edge preferably riveted to the lower flange of the end sill.

The center or draft sills 8, instead of being rigidly connected to the underframe as is usual, are mounted for longitudinal frictional movement with respect thereto, whereby the capacity of the cushioning mechanism is increased. For accomplishing this construction the outer ends of the sills 8 are connected by a combined casting 9 functioning as a sill tie member and striking casting, cheek plates and stop casting, as well as having flanges or ribs 10 adjacent the upper edge thereof for engaging corresponding flanges or ribs 11 spaced beneath the connecting casting 6 for movably mounting the casting 9 and associated sills 8 with respect to the car underframe. The rear edge of the plate casting 6 is preferably flanged, as indicated at 12, to form the upper portion of a front underframe stop, the lower portion of which is supplied by the transverse channel member 4.

The cushioning mechanism in the present embodiment involves three relatively long coil springs 13 which extend between the front follower 14 through a guide member (not shown) and the bolster (not shown) to the rear follower 15, the rear end of which normally abuts against a sill-connecting member or backstop 16 connected between the sills 8 and adapted to communicate movement of said sills to said rear follower. Upon inward movement of the coupler and corresponding movement of the sills, the backstop 16 moves rearwardly with respect to the rear follower 15 and said rear follower is maintained in position with respect to the underframe by stop lugs 17 which may be integral with the bolster filler casting (not shown). Upon the application of draft forces the springs are compressed by the backstop 16 engaging the rear follower 15 and acting on the springs, the front ends of which are stopped by the front follower 14 and the stops 12 and 4.

The coupler 18 in the present embodiment is of a type somewhat similar to that shown in the Barrows Patent #1,431,717 of October 10, 1922, and involves a shank or stem portion 19 formed with rearwardly extending horizontal webs 20, the rear edges of which are curved and pivotally received in corresponding pocketed portions 21 in a swivel block 22. Said swivel block 22 is formed with upper and lower flanges or webs 23 embracing the webs 20 on the stem of the coupler and an intermediate web 24 extending between said webs 20. The swivel block and coupler are pivotally connected together by means of an upright pivot pin 25, which is desirably retained in position by having its lower end notched, as indicated at 26, and engaging a forwardly extending lug portion 27 on the swivel block, whereby said pin 25 is not only prevented from loss but also prevented from turning with respect to the swivel block so that wear thereof is restricted to the portions engaged by the webs 20 on the coupler stem. The upper end of the pin 25 is preferably plain and a pair of lugs 28 perforated for receiving a retaining cotter 29 are desirably provided for preventing undesired upward movement of said pin. It will be understood that the curvature of the rear edges of the webs 20 on the coupler and the corresponding engaging faces of the pockets in the swivel block are coaxial with the pivot pin 25, whereby pivotal motion between said coupler and swivel block is permitted.

The coupler is connected to the sills 8 by means of a horizontal key 30 which extends through the coupler stem, partially intersects the key 25, and is embraced by bifurcated portions of the central web or flange 24 of the swivel block, the ends of said key being received in slotted portions 31 of the sills 8 and end casting 9, said slots being slightly longer than the corresponding dimension of the key 30 to permit a slight rearward movement of said key upon the application of buffing forces. The slotted portion 32 in the coupler stem is also slightly longer than the width of the key so as to provide for the desired angling motion of the coupler.

The rear surface of the swivel block 22 is preferably flat and engages a corresponding front face on an auxiliary follower or force-transmitting member 33, the side edges of the front face of said member 33 being formed with forwardly extending lug portions 34 embracing the rear portion of the swivel block and maintaining the desired relation therebetween. Said force-transmitting member 33 and swivel block snugly fit in the combined casting 9 which maintains them in position to permit the desired longitudinal movement thereof, the rigidifying flange 35 around the slotted portion 31 in the combined casting 9 being extended rearwardly between said lugs 34 and forwardly to the front of the casting for strengthening and guiding purposes. The rear portion of the auxiliary follower 33 is decreased in cross section, as indicated at 36, leaving shouldered portions adapted to limit rearward movement of said follower 33, and extends through a correspondingly shaped aperture 37 in the rear wall of the combined casting 9 and engages the front face of the front follower 14 for transmitting buffing forces thereto.

In order to permit the insertion and removal of the coupler butt which is enlarged due to the swiveling construction described, upper and lower blocks 38 and 39 are provided, said upper block having its lower side notched at the ends, as indicated at 40, for receiving corresponding supporting ledge portions 41 on the combined casting 9. Said block is retained in position by a transverse pin 42 which is prevented from loss or undesired removal by means of cotters or the like 43. The lower block 39 is retained in position in a similar manner by means of a transverse pin 44 with cotters or the like 45 and the upper side of said block is notched at 46 to receive corresponding ledge portions 47 on the combined casting 9. Both of said blocks 38 and 39 are provided with lip portions 48 and 49, respectively, which overlie the outer sides of the combined casting 9, as illustrated and which, together with the engagement with the lugs 41 and 47 and the engagement of the lower face of the block 39 on the upper face of the tie portion 50 of the combined casting 9, relieve the pins 42 and 44 from strains, said pins being merely relied upon to retain the blocks in place.

Upon the application of buffing forces to the coupler the same are transmitted from the swivel block portion thereof through the auxiliary follower 33 to the front follower 14 and from there to the main cushioning springs 13. As the follower 14 moves away from the stop portions 12 and 4, it is retained at the desired elevation by any desired means such, for example, as an angular member 51 connected to the depending inner flange of the channel member 4.

Referring now to the modification of our invention illustrated in Figures 5 and 6, a construction is there disclosed which may be identical with that of the first embodiment, except that the swivel block 22ª is combined with the auxiliary follower so that an extension 33ª is formed thereon, which functions to transmit forces between the coupler stem 19ª and the front follower 14ª. As in the previous embodiment, underframe stops 12ª and 4ª are provided and a horizontal key 30ª serves to support the coupler stem 19ª and is connected to the movable sills 8ª. The cushioning mechanism may be identical with that of the previous embodiment and comprise three longitudinally extending coil springs 13ª.

Referring now to the embodiment of our invention illustrated in Figures 7 and 8, a swivel butt coupler 18ᵇ is there disclosed used with cushioning mechanism of the character described in connection with the first embodiment. In the present embodiment said coupler is of the type disclosed in the Couch Patent #1,634,398, dated July 5, 1927, and involves a stem 52 slotted at 53 for receiving a horizontal supporting and connecting key 54, the ends of which are received in slotted portions 31ᵇ in the sills 8ᵇ and combined casting 9ᵇ as in the first embodiment. The rearward portion of the slot 53 is enlarged to form a pocket 55, said pocket being provided with rear faces formed as cylindrical bearing portions 56.

A shim 57 shaped to accurately fit into the rear portion of the pocket 55 and formed with correspondingly curved bearing portions 58 for pivotal engagement with respect to the coupler bearing portions 56 is provided and seated in said coupler pocket 55. The forward face 59 of the shim, when positioned in the coupler pocket, is substantially flat, except where a bearing pocket 60 is provided for engagement with the key member 54. It is necessary to first insert the shim 57 in place in the pocket 55 of the coupler and when the key 54 is passed through the slot 53 therein, it serves to lock the shim in place and prevent loss thereof while the parts are assembled.

The rear face or butt portion of the coupler stem 52 is preferably curved coaxially with respect to the curved portions 56 of the pocket in the coupler butt. This curved outer portion of the coupler butt fits into and engages with a swivel block or auxiliary member 61 between the coupler butt and the rear wall of the combined casting 9ᵇ. Said auxiliary member 61 is formed with a coaxially curved bearing portion 62 in which the butt of the coupler fits and bears against.

The auxiliary member 62 is formed with outstanding lugs 63 which engage force-transmitting pins 64, the rear ends of which fit into corresponding pockets 65 in the front follower 14ᵇ for transmitting buffing forces to said follower and from there to the springs 13ᵇ of the cushioning mechanism. As in the previous embodiment stop portions 12ᵇ and 4ᵇ are provided, the pins 64 serving to hold the front follower 14ᵇ at the proper elevation. The slots 31ᵇ are of sufficient length to permit a slight preliminary movement of the coupler with respect to the movable sills and the slot in the coupler is sufficiently long to permit the desired angling movement of the coupler with respect to the key. On account of the depth of the coupler butt being much less than that of the coupler of the previous embodiment, it is not necessary to use removable filler blocks such as designated by the reference characters 38 and 39 of the first embodiment and an ordinary form of striking portion and sill tie portion may be employed with a usual form of wear plate 66 applied over the sill tie portion 50ᵇ of the casting. Except as specifically described in connection with the present embodiment, same may correspond with that of the first embodiment, except that it is not necessary to use follower supporting means such as designated by the reference character 51 in the first embodiment for the front follower, as the force-transmitting pins function for holding said follower at the proper elevation.

Figure 8:
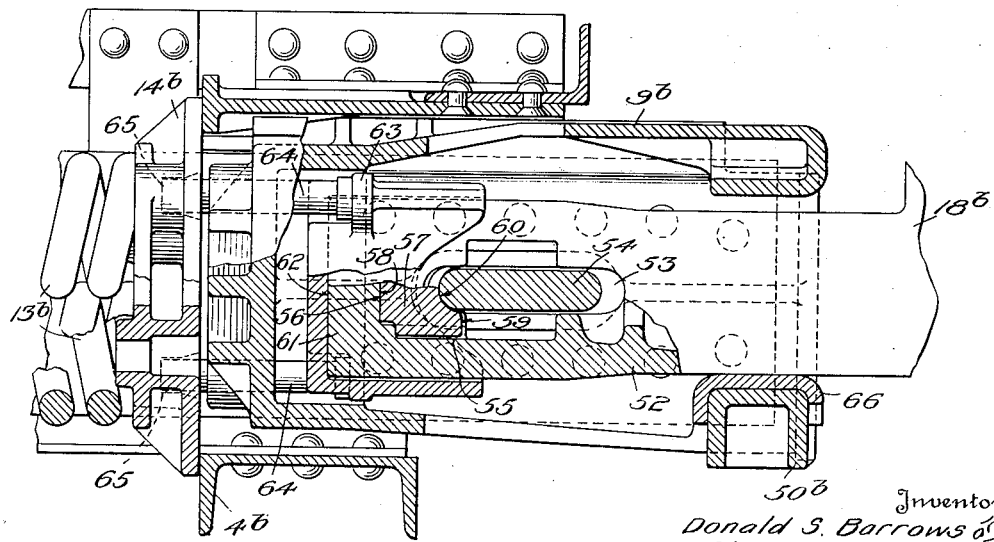
Figure 8 is a central vertical longitudinal sectional view of the construction illustrated in Figure 7.

Referring now to the embodiment of our invention illustrated in Figures 9 and 10, a construction is there disclosed which is identical with that disclosed in Figures 7 and 8, except that the force-transmitting pins are not employed and the auxiliary member or swivel block 61ᶜ is formed with a rearward extension 33ᶜ corresponding with the extension 33ª of the embodiment illustrated in Figures 5 and 6, said extension serving as force-transmitting means between the coupler stem 19ᶜ, the swivel block 61ᶜ and the front follower 14ᶜ for transmitting buffing forces to the springs 13ᶜ of the cushioning mechanism. Inasmuch as no force-transmitting pins are employed, it is necessary to use some other means, such as the angular member 51ᶜ for supporting the front follower 14ᶜ. Except as specifically described, the construction of the present embodiment may correspond with that of the first embodiment.

Referring now to the embodiment of our invention illustrated in Figures 11 and 12, a construction is there disclosed corresponding with that of the first embodiment in most respects. Auxiliary cushioning means, which preferably take the form of vertically curved leaf springs 67 are provided between auxiliary follower devices 68, against which the rear face of the swivel block 22ᵈ engages, and the rear of a short horizontal yoke 69. Said yoke is connected to the swivel butt coupler 19ᵈ by means of a horizontal key 30ᵈ passing through correspondingly slotted portions in the movable sills 8ᵈ and the combined casting 9ᵈ, with the slots of sufficient length to permit preliminary relative movement of the key in both directions.

In the present embodiment the rear end of the combined casting 9ᵈ is open to a sufficient extent to permit the butt of the yoke 69 to extend therethrough and engage the forward face of the front follower 14ᵈ, which in turn engages the springs 13ᵈ. Inasmuch as in the present embodiment the butt of the coupler is of the form illustrated in the first embodiment, and, therefore relatively deep, removable blocks 38ᵈ and 39ᵈ are provided as in the first embodiment.

In the present embodiment the channel 4ᵈ is apertured, as indicated at 70, for application and removal of the auxiliary followers 68, which also serve as keys or stop portions for holding the cushioning plates 67 in the desired relation with respect to the combined casting 9ᵈ. After assembly the aperture 70 is desirably closed by means of a plate 71, which may be held in position in any desired manner, as by means of an angular web 72, riveted or otherwise secured to said plate and the depending outer flange of the channel member 4ᵈ.

Referring now to the embodiment of our invention illustrated in Figures 13 and 14, a construction is there disclosed utilizing a coupler 18ᵉ, with an interior shim 57ᵉ of a character somewhat as disclosed in connection with the embodiment illustrated in Figures 7 and 8 and an exterior or auxiliary shim or swivel block 61ᵉ, the rear face of which abuts an auxiliary follower 68ᵉ. The combined casting 9ᵉ is formed with stop lug portions 73 which function to limit forward movement of the follower 68ᵉ. Between the auxiliary follower 68ᵉ, which is formed with rearwardly extending spring-retaining lugs 74, and the rear of a short vertical yoke 69ᵉ, employed with said coupler, are horizontally curved spring plates 67ᵉ functioning as auxiliary cushioning means, which act upon either inward or outward movement of the coupler with respect to the longitudinally movable sills 8ᵉ. As in the previous embodiment the rear of the yoke 69ᵉ extends through the rear end of the combined casting 9ᵉ and engages the front follower 14ᵉ, which in turn abuts the main cushioning springs 13ᵉ. As in the embodiment illustrated in Figures 7 and 8, no removable front blocks 38 and 39 are necessary, a removable wear plate 66ᵉ merely being employed over the coupler carrier portion 50ᵉ. Inasmuch as the sills and combined casting are slotted both forwardly and rearwardly of the supporting key 30ᵉ, relative movement of the coupler with respect to the sills is permitted both forwardly and rearwardly as in the embodiment illustrated in Figures 11 and 12. Except as specifically described in connection with the present embodiment, the same may correspond with that of the first embodiment.

Although we have illustrated only a few arrangements whereby swivel butt couplers may be employed in connection with a gear of the type involving sills which move frictionally with respect to the remainder of the underframe, it is to be understood that we do not wish to be limited to the particular embodiments illustrated, as other embodiments are contemplated within the spirit and scope of our invention. For example, the coupler disclosed in Figures 13 and 14 may be employed in a manner similar to that in which the coupler of Figures 1–4, inclusive, and that of Figures 7 and 8, is employed. More specifically, we may use the coupler of Figures 13 and 14 with the rigging as disclosed in Figures 1–4, inclusive, omitting the use of the vertical yoke and auxiliary cushioning plates and permitting the rear of the coupler to abut directly against a force-transmitting block corresponding to the block 33 of the first embodiment, the rear end of which engages the forward face of the front follower 14, or we may use said coupler with force-transmitting pins, such as disclosed in Figures 7 and 8, or with an integral rearward extension or projection engaging the front follower, as shown in Figures 9 and 10. It will also be obvious that the coupler illustrated in Figures 13 and 14 may be employed with a horizontal yoke, such as shown in Figures 11 and 12, and vertically curved cushioning plates, rather than with the vertical yoke and horizontally curved cushioning plates, as illustrated. Another modification which suggests itself is the use of a coupler such as illustrated in Figures 13 and 14 in which the rear member or swivel block is formed integral with the auxiliary followers or stop members, such as designated by 68 in Figures 11 and 12, said followers being supported from the shank or stem of the coupler 18ᵉ and a short horizontal yoke being used, as in Figures 11 and 12.

The foregoing embodiments considered within the scope of our invention are to be taken as illustrative and not limiting, and a description thereof merely is furnished to avoid making the application unduly long, it being considered that said description will be amply understood by reference to the figures of the drawings already in the case.

From the foregoing it will be apparent that in all of the embodiments disclosed provision is made for limited angling movement in a horizontal plane between the coupler and the sills of the car. The draft rigging is such that in the embodiments illustrated in Figures 1–10, inclusive, a preliminary relative movement between the coupler and draft sills on buff is provided for, while in the embodiments disclosed in Figures 11—14, inclusive, provision is made for preliminary movement between the coupler and draft sills, both upon the application of buffing forces and draft forces by virtue of providing auxiliary cushioning means in the form of curved plate springs. After the preliminary movement, the sills start to move relative to the remainder of the underframe and the draft or buffing force is cushioned by the main cushioning springs 13, to which force is transmitted through the front follower upon the application of buffing forces and from the backstop and rear follower upon the application of draft forces. Upon the application of buffing forces, the forces are finally transmitted, after being cushioned by the main cushioning springs, through the rear follower to the stop lugs 17 on the underframe. Likewise, upon the application of draft forces, said forces, after being cushioned by the main cushioning springs, are finally transmitted to the underframe through the front follower 14 and the portions 12 and 4 of said underframe, which function as front stop portions.

Having thus described our invention, we claim,—

1. In railway draft rigging, sills movably mounted with respect to an associated car, cushioning mechanism between said sills for cushioning movement of the sills with respect to the car, a front follower for said cushioning mechanism, a coupler with an articulated stem, a yoke with forwardly extending portions embracing said stem, a key intersecting said stem, yoke and sills for transmitting forces therebetween, an auxiliary follower disposed to the rear of said coupler and extended to engage stops on the sills, and auxiliary spring means disposed between said auxiliary follower and the rear of said yoke for providing preliminary cushioning of draft and buffing forces prior to movement of the sills relative to the car, the rear of said yoke engaging said front follower for transmitting buffing forces thereto.

2. In railway draft rigging, sills slidably mounted on an associated railway vehicle underframe for longitudinal movement with respect thereto, means disposed between said sills for cushioning movement thereof with respect to said underframe, a front follower for said cushioning means, a casting connecting the ends of said sills, a coupler with a stem received in said casting, a swivel block articulated with respect to said stem, means connecting said stem and casting for transmitting forces therebetween, and means integral with said swivel block, extending rearwardly therefrom and passing through an aperture in said casting for transmitting buffing forces to said follower for cushioning rearward movement of the coupler with respect to said sills.

3. In railway draft rigging, in combination with a railway vehicle underframe, sills movably mounted with respect to said underframe, resilient means mounted between said sills, a rear follower for said resilient means, a backstop for said follower mounted between said sills, stop means on the underframe engaging said follower upon movement of the sills with respect to said stop means in one direction, a combined cheek plate and stop casting connecting said sills, an articulated coupler comprising a shank portion and a swivel block pivotally connected thereto, a key connecting said coupler and sills and permitting limited relative movement therebetween, a front follower disposed between said resilient means and combined casting, and a force-transmitting member disposed between said coupler and follower, said member having a front face directly engaged by said coupler and an integral extension of reduced cross-section engaging the front face of said front follower, said combined casting being apertured to receive said extension and providing shoulders engaging said force-transmitting member for limiting rearward movement thereof, whereby rearward movement of said coupler with respect to said sills is yieldingly resisted for a limited distance.

4. In railway draft rigging, in combination with a railway vehicle underframe, sills movably mounted with respect to said underframe, resilient means mounted between said sills, a rear follower for said resilient means, a backstop for said follower mounted between said sills, stop means on the underframe engaging said follower upon movement of the sills with respect to said stop means in one direction, a combined cheek plate and stop casting connecting said sills, a coupler shank, and auxiliary means providing a forwardly opening pocketed portion articulatingly receiving the rear portion of said shank, a key connecting said coupler and sills and permitting limited relative movement therebetween, a front follower disposed between said resilient means and combined casting, said auxiliary means comprising a force-transmitting member disposed between said shank and follower, said member having a rear portion engaging the front face of said front follower, said combined casting being apertured to receive said rear portion and providing shoulders for limiting rearward movement of said coupler, whereby rearward movement of said coupler with respect to said sills is yieldingly resisted for a limited distance.

5. In railway draft rigging, sills movably mounted in guides on the underframe of a railway vehicle, resilient means mounted between said sills, a rear follower for said resilient means, a backstop for said follower mounted between said sills, stop means on the underframe engaging said follower upon movement of the sills with respect to said stop means in one direction, a combined cheek plate and stop casting connecting said sills, a coupler with its stem received between said sills, a block pivotally connected to the rear portion of said stem, a key connecting said coupler and sills, said key being loosely received in said sills so as to permit limited movement of said coupler with respect to said sills, and a front follower for said resilient means, said block being provided with an integral extension and said combined cheek plate and stop casting being apertured to receive said extension and allow it to engage the front follower, whereby said resilient means serves to yieldingly resist movement of said coupler with respect to said sills.

6. In railway draft rigging, sills movably mounted with respect to the underframe of a railway vehicle, springs mounted between said sills, stops on said underframe for stressing said springs upon movement of the sills with respect to said underframe, a combined casting functioning as cheek plates, striking casting and sill tie disposed between and connected to the ends of said sills, a coupler with a stem received in said combined casting, a block pivotally connected to the rear portion of said stem, key means intersecting said associated stem and block and extending to the combined casting to provide for the transmission of forces therebetween, said casting being formed with an aperture in a rear wall thereof, and said block having an integral extension received in said aperture and adapted to act on said springs, and removable blocks disposed above and below the coupler stem at the front of said combined casting to allow for enlargement of the opening thereto upon the application or removal of the coupler and the block pivotally associated therewith.

7. In railway draft rigging, a pair of structural members connected at end and intermediate portions by castings to form a rigid structure, said structure being supported and slidably mounted between longitudinal members of the underframe of an associated railway vehicle, cushioning mechanism including a front follower mounted between said structural members and connected thereto and to the underframe so as to be actuated upon movement of said members with respect to the underframe, a coupler with a stem received between said structural members, means intersecting said stem and structural members for connecting the stem while permitting limited relative movement of the coupler with respect thereto, and other cushioning mechanism disposed between and normally engaging the rear portion of said coupler stem and the front follower of said mechanism to provide preliminary shock absorption upon movement of the coupler with respect to the structural members and prior to movement of said members with respect to the underframe.

8. In railway draft rigging, in combination with a railway vehicle underframe, sills mounted for longitudinal movement with respect to said underframe, mechanism between said sills for cushioning movement thereof with respect to said underframe, a front follower for said cushioning mechanism, a coupler with a stem received between said sills, a yoke with forwardly extending portions embracing said stem, a key connecting said stem and yoke and with its ends received in corresponding slots in said sills for transmitting forces therebetween, an auxiliary follower disposed rearwardly of said stem, stops on said sills engageable by said auxiliary follower, and auxiliary spring means disposed between said auxiliary follower and the rear of said yoke for providing preliminary cushioning of draft and buffing forces prior to movement of the sills with respect to the underframe, the rear of said yoke engaging said front follower for transmitting buffing forces thereto.

9. A combined casting comprising portions serving, respectively, as a striking casting and sill tie member, means for movably mounting said casting with respect to an associated railway vehicle underframe, said casting comprising sides connecting said striking portion and sill tie portion, said striking portion comprising an upper web and the sill tie portion being spaced therebeneath, a wear block disposed adjacent the striking portion and above the sill tie portion, said block providing space above the sill tie portion for receiving the stem of an associated coupler therebeneath and comprising a body portion disposed below the upper web, a retaining pin extending transversely and intersecting said body portion of said block and the sides of said combined casting, and additional means for retaining said block in place comprising ledges extending from the combined casting and engaging notched portions in the lower part of said block.

10. A combined casting, means for slidably supporting it on an associated railway vehicle underframe, said casting comprising portions serving, respectively, as a striking casting and sill tie member, said casting comprising sides connecting said striking portion and sill tie portion, said striking portion comprising an upper web, the sill tie portion being spaced therebeneath, a wear block supported by means of said sill tie portion and normally spaced beneath the striking portion for receiving the stem of an associated coupler thereabove and comprising a body portion, a retaining pin extending transversely and intersecting said body portion and the sides of said combined casting, and additional means for retaining said block in place comprising ledges extending from said combined casting and engaging notched portions in the upper part of said block.

11. A combined casting, means for slidably supporting it from an associated railway vehicle underframe, said casting comprising portions serving, respectively, as a striking portion and sill tie member, said casting comprising sides connecting said striking portion and sill tie portion, said striking portion comprising an upper web, the sill tie portion being spaced therebeneath, a wear block partially closing the space between the striking portion and sill tie portion and adapted to be engaged by the stem of an associated coupler when received in said combined casting, said block comprising a body portion with a retaining pin extending transversely and intersecting said body portion and the sides of said combined casting, said block having a lip overlying a vertically disposed portion of said combined casting for assisting said pin in retaining said block in place.

12. In combination with the underframe of a railway vehicle, a casting secured in the lower portion of said underframe and having laterally spaced depending portions with flange portions extending toward one another to provide a track, a combined casting functioning as cheek plates, striking casting and sill tie with outwardly extending flange portions adjacent its upper part overlying said track for slidably mounting said casting with respect to said underframe, sills secured to outer walls of said casting to enable said sills to move longitudinally with respect to said underframe, cushioning mechanism mounted between said sills, a coupler with a stem received in said combined casting, means pivotally connected to the rear portion of said stem, key means intersecting said associated stem and pivotally connected means and extending to the combined casting to provide for the transmission of forces therebetween, said casting having an aperture in a rear wall thereof, and said means comprising an extension received in said aperture for acting on said cushioning mechanism, and means associated with the outer portion of said casting for guiding said coupler stem and providing for the enlargement of the stem-receiving opening for application and removal of said stem and the means pivotally connected thereto.

DONALD S. BARROWS.
GLENN F. COUCH.